(12) United States Patent
Webb et al.

(10) Patent No.: US 7,129,455 B2
(45) Date of Patent: Oct. 31, 2006

(54) SYSTEMS AND METHODS FOR MODIFYING WAVEFRONTS BY AMPLIFYING STROKE

(75) Inventors: Robert H. Webb, Lincoln, MA (US); Clara E. Dimas, Malden, MA (US)

(73) Assignee: Boston Micromachines Corporation, Watertown, MA (US)

( * ) Notice: Subject to any disclaimer, the term of this patent is extended or adjusted under 35 U.S.C. 154(b) by 455 days.

(21) Appl. No.: 10/702,708

(22) Filed: Nov. 6, 2003

(65) Prior Publication Data

US 2005/0254112 A1 Nov. 17, 2005

Related U.S. Application Data

(60) Provisional application No. 60/424,256, filed on Nov. 6, 2002.

(51) Int. Cl.
*G01J 1/20* (2006.01)
(52) U.S. Cl. .................... 250/201.9; 250/216
(58) Field of Classification Search ............ 250/201.9, 250/216
See application file for complete search history.

(56) References Cited

U.S. PATENT DOCUMENTS 4,120,569 A * 10/1978 Richards, Jr. ................. 359/11

OTHER PUBLICATIONS

Liang, et al., "Supernormal vision and high-resolution retinal imaging through adaptive optics", Optical Society of America, J. Opt. Soc. Am. A, vol. 14, No. 11, Nov. 1997, pp. 2884-2892.

Burns, et al., "Contrast improvement of confocal retinal imaging by use of phase-correcting plates" Optical Society of America, Optics Letters, vol. 27, No. 6, Mar. 15, 2002, pp. 400-402.

Doble, et al., "Use of a microelectromechanical mirror for adaptive optics in the human eye", Optical Society of America, Optics Letters, vol. 27, No. 17, Sep. 1, 2002, pp. 1537-1539.

Roorda, et al., "Adaptive optics scanning laser ophthalmoscopy", Optics Express, vol. 10, No. 9, May 6, 2002, pp. 405-412.

Perreault, et al., "Adaptive optic correction using microelectromechanical deformable mirrors", SPIE—Society of Photo-Optical Instrumentation Engineers, vol. 41, No. 3, 2002, pp. 561-566.

Bifani, et al, "Microelectromenchanical Deformable Mirrors", IEEE—Journal of Selected Topics in Quantum Electronics, vol. 5, No. 1, Jan./Feb. 1999, pp. 83-89.

* cited by examiner

*Primary Examiner*—Que T. Le
(74) *Attorney, Agent, or Firm*—Peter A. Nieves, Esq.; Sheehan, Phinney, Bass & Green, P.A.

(57) ABSTRACT

A system and method modifying wavefront shape is provided. Generally, the system contains a wavefront shape modifying device for modifying the shape of the wavefront. The system also contains a series of optical devices for returning the modified wavefront to the wavefront modifying device with an orientation that enables further modification of the modified wavefront by the wavefront modifying device. The method contains the steps of: reflecting a wavefront from a surface of a wavefront shape modifying device, resulting in the wavefront having a modified shape; and reflecting the wavefront having a modified shape from the surface of the wavefront shape modifying device a second time resulting in a final wavefront having a shape that has been modified twice.

26 Claims, 7 Drawing Sheets

SYSTEMS AND METHODS FOR MODIFYING WAVEFRONTS BY AMPLIFYING STROKE

CROSS-REFERENCE TO RELATED APPLICATION

This application claims priority to copending U.S. Provisional Application entitled, "Multiplier For Adaptive Optic Deformable Mirror," having Ser. No. 60/424,256, filed Nov. 6, 2002, which is entirely incorporated herein by reference.

FIELD OF THE INVENTION

The present invention is generally related to optics, and more particularly is related to systems and methods for modifying wavefront shape.

BACKGROUND OF THE INVENTION

Adaptive optics is utilized to modify optical wavefronts. As an example, adaptive optics may be used to correct for existing aberrations recognized by optical systems. Specifically, adaptive optics may be used to correct aberrant wavefronts by modifying shape of the wavefront. Such correction appeals to many fields, including, but not limited to, astronomy, ophthalmology, and microscopy. As an example, in the field of astronomy adaptive optics may compensate for aberrations due to atmospheric turbulence and/or telescopic errors (i.e., lens errors). As a further example, in the field of ophthalmology, adaptive optics provide a means of measuring and compensating for aberrations in human vision. In addition, adaptive optics may be utilized to modify optical wavefronts without consideration of aberrations. It should be noted herein that a wavefront can be defined as a plurality of locations in space having a constant phase.

It should be noted that the term "optical phase" refers to the difference between the place or time where the sinusoidal amplitude of the electromagnetic field that is a light wave is at peak, and the place or time at which it is reduced, simply because it is a sine wave. $E=A \sin(2\pi ft+phase)$. Since light extends in three dimensions, we call a surface of constant phase a wavefront. It is the shape of this surface that the deformable mirror will change, and we describe that as a change in the local phase, but the term should be understood to mean a change in the local shape of this surface of constant phase.

Adaptive optics attempt to correct for existing aberrations via use of wavefront sensors, controllers, and/or wavefront corrective devices. FIG. 1 is a schematic diagram illustrating an example of a basic adaptive-optical wavefront modification system 10 that contains a wavefront sensor 20, a controller 30, a wavefront corrective device 40, such as a deformable mirror 40, and a beam splitter 50. As is known by those having ordinary skill in the art, the wavefront sensor 20 assesses, or measures, aberrations in an aberrant wavefront received by the adaptive-optical wavefront modification system 10. An example of a wavefront sensor 20 is a Shack-Hartmann sensor, such as a WaveScope wavefront measurement system manufactured by Adaptive Optics Associates of Massachusetts, USA.

Typically, a wavefront sensor 20 uses software to assess changes in wavefront shape caused by the deformable mirror 40, after energizing by the controller 30, as explained below. As an example, information regarding wavefront shape changing may be used by the wavefront sensor 20 to create a conjugate shape on the deformable mirror 40 to correct wavefront aberrations. The wavefront sensor 20 may use a least-squares estimation of the wavefront to determine the changes in the deformable mirror 40 caused by energizing.

The beam splitter 50 is used by the basic adaptive-optical wavefront modification system 10 to separate a part of the corrected wavefront. Since one having ordinary skill in the art would understand how such separation is performed, a detailed description of separation performed by the beam splitter 50 is not provided herein.

After assessing aberrations, the wavefront sensor 20 transmits information to the controller 30 regarding requirements to create the conjugate shape on the deformable mirror 40, as signified by the dotted line located between the wavefront sensor 20 and the controller 30. In accordance with requirements to provide the conjugate shape, the controller 30 transmits control signals, such as, but not limited to, a voltage, to the deformable mirror 40. The received voltage causes actuators (not shown) located within the deformable mirror 40 to move in a surface normal direction in accordance with stroke of each actuator and the control signals, thereby providing a small local step within the deformable mirror 40, or deforming the deformable mirror 40. For simplicity, in the remainder of this document deformation of the deformable mirror or wavefront correcting device will be described as a step, though in practice this deformation may not be step-like: it might be smooth, ramped, or arbitrarily shaped. The step of the deformable mirror 40 modifies the wavefront so as to impress on the wavefront a change of shape in the areas of the wavefront that have been reflected by the step of the deformable mirror 40.

The step, through the change of phase in the wavefront, corrects aberrations in the received aberrant wavefront by canceling aberrations with the conjugate shape provided. Specifically, the conjugate shape provided to the aberrant wavefront is intended to cancel the aberrations. Since one having ordinary skill in the art would understand how the actuators are caused to move, a detailed description of actuator movement is not provided herein. It should be noted that in the present disclosure, the term actuator is utilized to identify elements of a deformable mirror that have a stroke.

More commonly known deformable mirrors have actuators that are either piezoelectric or electrostatic devices. Unfortunately, known deformable mirrors are characterized as being difficult to achieve more than a few microns of actuator stroke without greatly increasing expense and/or complexity of the deformable mirror. In addition, it is a general rule that the larger the actuator stroke of a deformable mirror, the more that aberrations in an aberrant wavefront may be removed. Therefore, aberrant wavefront correction by current adaptive-optical wavefront modification systems is restricted. In addition, the amount of altering of the shape of a wavefront is restricted.

Thus, a heretofore unaddressed need exists in the industry to address the aforementioned deficiencies and inadequacies.

SUMMARY OF THE INVENTION

Embodiments of the present invention provide systems and methods for modifying shape of a wavefront by increasing effective stroke of a deformable mirror. Briefly described, in architecture, one embodiment of the system, among others, can be implemented as follows. The system contains a wavefront shape modifying device for modifying the shape of the wavefront and a series of optical devices for returning the modified wavefront to the wavefront shape modifying device with an orientation that enables further modification of the modified wavefront by the wavefront shape modifying device.

The present invention can also be viewed as providing methods for providing arbitrary wavefront shapes by amplifying the effect of a deformable mirror on phase of a wavefront. In this regard, one embodiment of such a method, among others, can be broadly summarized by the following steps: reflecting a wavefront from a surface of a wavefront shape modifying device, resulting in the wavefront having a modified shape; and reflecting the wavefront having a modified shape from the surface of the wavefront shape modifying device a second time resulting in a final wavefront having a shape that has been modified twice.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components and positioning in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present optical stroke amplification system multiplies the physical stroke of actuators located within a deformable mirror to assist in modifying shape of a wavefront, thereby increasing the effective stroke of the deformable mirror. Therefore, the effective stroke of the deformable mirror is increased without physically increasing a step of the deformable mirror, or increasing the physical stroke of the deformable mirror actuators. It should be noted that the present systems and methods of modifying shape of a wavefront may be utilized in the fields of astronomy, ophthalmology, microscopy, or any other field that uses optics and/or a wavefront corrector or wavefront phase modifying device.

The present description is provided with reference to use of an optical stroke amplification system within an adaptive optical wavefront modification system that is used to correct aberrant wavefronts, however, it should be noted that the optical stroke amplification system may instead be used to alter shape of a wavefront without consideration of wavefront aberrations. Therefore, while the following describes measuring wavefront aberrations, it is not a requirement for the optical stroke amplification system to be used in a system that first measures wavefront aberrations. In fact, the optical stroke amplification system may be used without measuring wavefront aberrations or any other properties of a wavefront. As an example, the optical stroke amplification system may be used to distort a wavefront to provide a focus adjustment for a camera, or simply to distort the wavefront in the fields of ophthalmology (e.g., for testing physiological response of an eye) and microscopy (e.g., for providing a prescribed distortion for a microscope in order to extend depth focus of the microscope). As a result, while the following discusses use of a wavefront sensor, one having ordinary skill in the art will appreciate that use of the optical stroke amplification system does not require use of a wavefront sensor.

Figure 1:
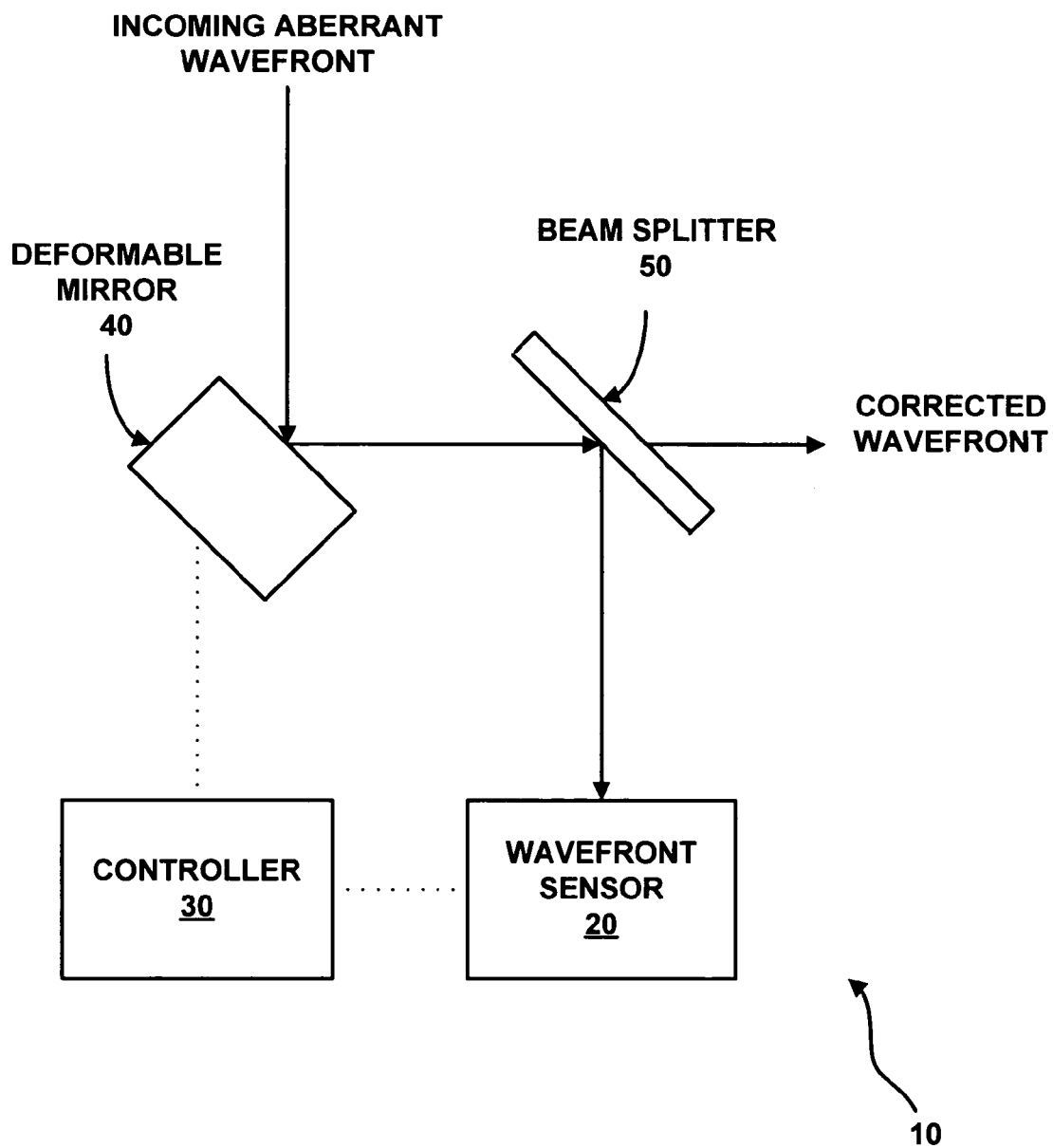
FIG. 1 is a schematic diagram illustrating an example of a basic adaptive-optical wavefront modification system.
Figure 2:
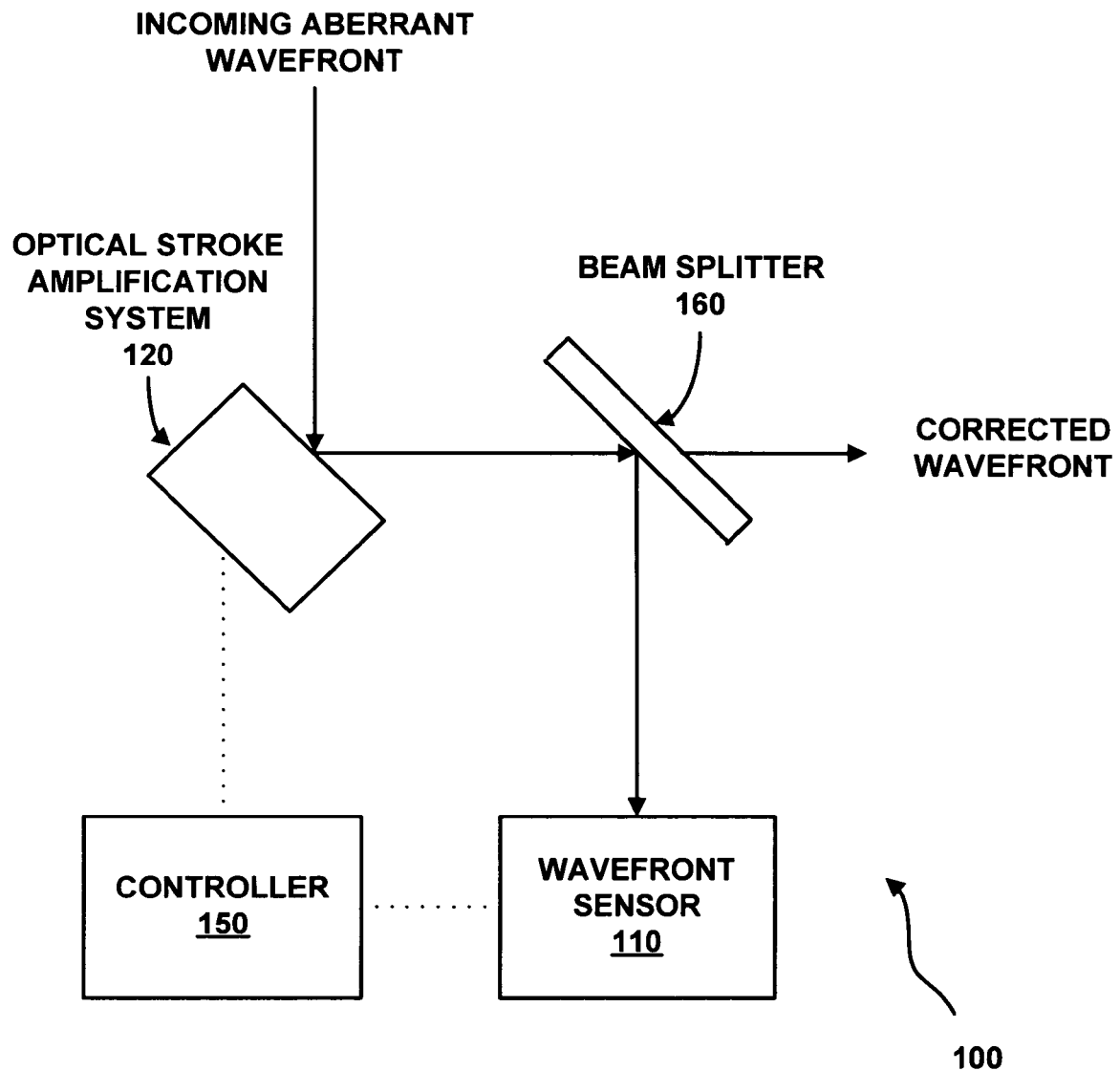
FIG. 2 is a schematic diagram illustrating an adaptive optical wavefront modification system 100 that may contain the optical stroke amplification system.

FIG. 2 is a schematic diagram illustrating an adaptive optical wavefront modification system 100 that may contain the present optical stroke amplification system 120. It should be noted that the adaptive optical wavefront modification system 100 of FIG. 2 is provided merely for exemplary purposes and that the optical stroke amplification system 120 may instead be located within different adaptive optical wavefront modification systems.

As is shown by FIG. 2, the adaptive optical wavefront modification system 100 contains a wavefront sensor 110, the optical stroke amplification system 120, a controller 150, and a beam splitter 160.

The wavefront sensor 110 assesses, or measures, aberrations in an aberrant wavefront received by the adaptive optical wavefront modification system 100. An example of a wavefront sensor 110 is a Shack-Hartmann sensor, such as a WaveScope wavefront measurement system manufactured by Adaptive Optics Associates of Massachusetts, USA.

The wavefront sensor 110 uses software to assess changes in wavefront shape caused by a deformable mirror located within the optical stroke amplification system 120 (shown by FIG. 3), after energizing by the controller 150, as explained below. As an example, information regarding wavefront shape changing may be used by the wavefront sensor 110 to create a conjugate shape on the deformable mirror to modify shape of the wavefront, thereby correcting for wavefront aberrations. The wavefront sensor 110 may use a least-squares estimation of the wavefront or, other fitting techniques to determine the changes in the deformable mirror caused by energizing.

After assessing aberrations, the wavefront sensor 110 transmits information to the controller 150 regarding requirements to create the conjugate shape on the deformable mirror, as signified by the dotted line located between the wavefront sensor 110 and the controller 150. In accordance with requirements to provide the conjugate shape, the controller 150 transmits control signals, such as, but not limited to, a voltage, to the deformable mirror. The received voltage causes actuators (not shown) located within the deformable mirror to move in a surface normal direction in accordance with stroke of each actuator and the control signals, thereby providing steps within the deformable mirror, or deforming the deformable mirror. The steps of the deformable mirror are used to modify the local optical phase of the wavefront, thereby correcting aberrations in the received aberrant wavefront by canceling aberrations with the conjugate shape provided. Specifically, the conjugate shape provided to the aberrant wavefront is intended to cancel the aberrations. Since one having ordinary skill in the art would understand how the actuators are caused to move, a detailed description of actuator movement is not provided herein.

Figure 3:
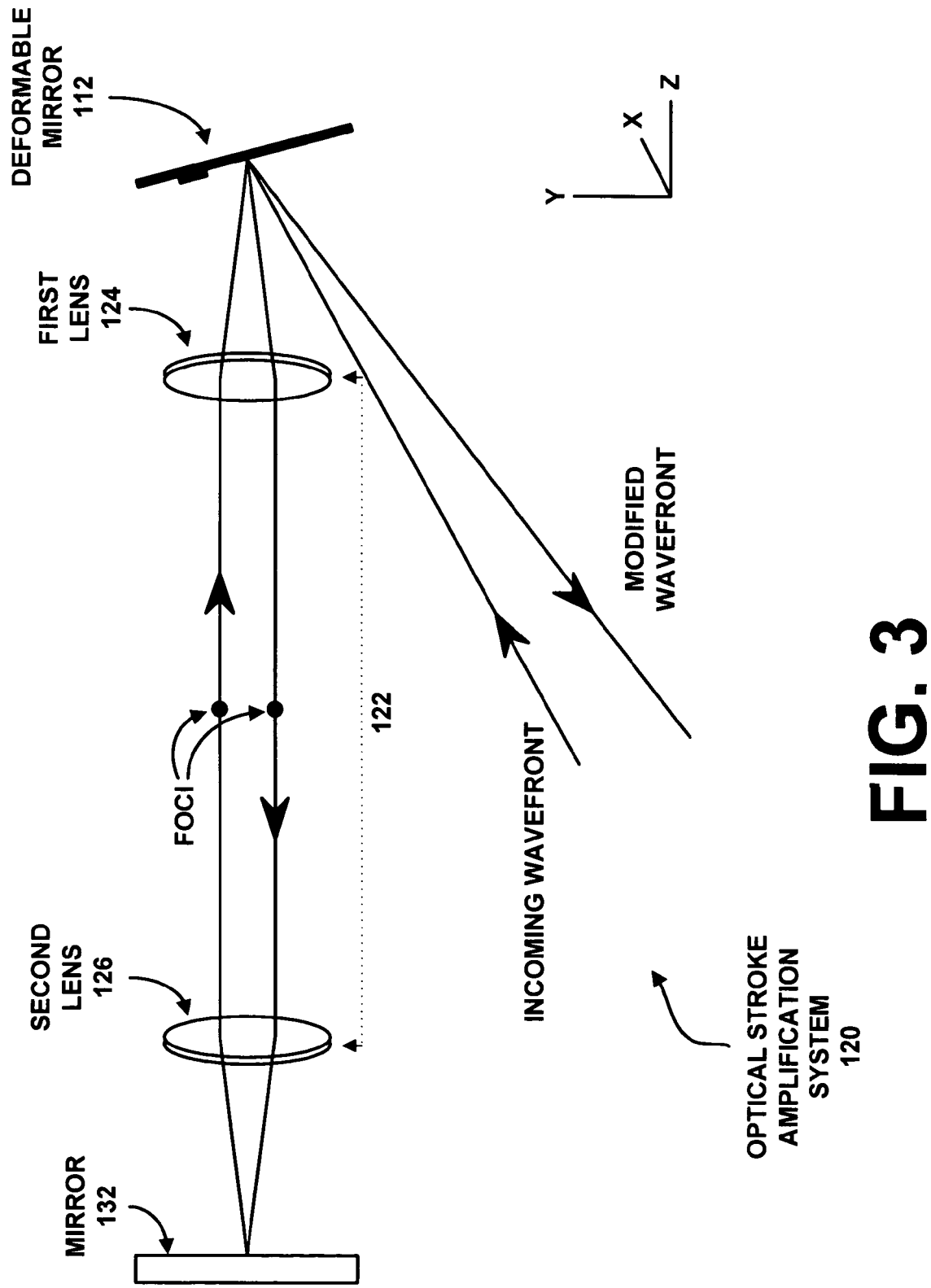
FIG. 3 is a schematic diagram further illustrating the optical stroke amplification system of FIG. 2.

The optical stroke amplification system 120 then multiplies the physical stroke of actuators located within the deformable mirror to assist in correcting aberrant wavefronts, thereby increasing the effective stroke of the deformable mirror. This increase in the effective stroke of the deformable mirror is performed without excessive additional cost to the adaptive optical wavefront modification system 100 and without having to increase the physical stroke of actuators located within the deformable mirror. FIG. 3, which is described below, further illustrates the optical stroke amplification system 120 of FIG. 2 and components located therein. In addition, a detailed description of how the effective stroke of the deformable mirror is performed is provided below.

FIG. 3 is a schematic diagram further illustrating the optical stroke amplification system 120 of FIG. 2, in accordance with a first exemplary embodiment of the invention. As is shown by FIG. 3, the optical stroke amplification system 120 contains a deformable mirror 112, a pair of optical lenses 122 containing a first lens 124 and a second lens 126, and a mirror 132. The deformable mirror 112 contains a series of actuators (not shown) each having a specific stroke. Collaboratively, the stroke of each actuator within a deformable mirror 112 is denoted herein as the stroke of the deformable mirror 112. When multiple actuators move in a direction normal to the plane of the deformable mirror 112, the actuators create a step, which, as is described below, is utilized to modify shape of received wavefronts. Since the maximum step of the deformable mirror 112 is restricted by the maximum physical stroke of actuators located within the deformable mirror 112, the optical stroke amplification system 120 utilizes optical devices, examples of which are described below, to increase the effective stroke of the deformable mirror 112 (i.e., increase the corrective results of the deformable mirror 112 step without physically increasing stroke of the deformable mirror actuators).

The first lens 124 is located one focal length of that lens from the deformable mirror 112. In addition, the second lens 126 is located the sum of the focal lengths of the two lenses from the first lens 124. Therefore, a focal point of the first lens 124 and a focal point of the second lens 126 are coincident and are located between the lenses 124, 126. The pair of lenses 124, 126 work together to invert an image of the deformable mirror 112 now encoded in the wavefront, and focus that image on mirror 132. Specifically, if a wavefront enters from the right of the first lens 124, traverses the first lens 124, exits from the left of the first lens 124, enters from the right of the second lens 126, traverses the second lens 126, and exits from the left of the second lens 126, the image of mirror 112, formed at mirror 132, will be inverted. In addition, if a wavefront enters from the left of the second lens 126, traverses the second lens 126, exits from the right of the second lens 126, enters from the left of the first lens 124, traverses the first lens 124, and exits from the right of the first lens 124, then the image at mirror 132 will fall on mirror 112 and be again inverted. Thus, the wavefront encoding the image of mirror 112 traverses the optical elements and returns to mirror 112, exactly matching that mirror in the transverse directions X and Y, but with the longitudinal direct Z reversed.

Figure 4:
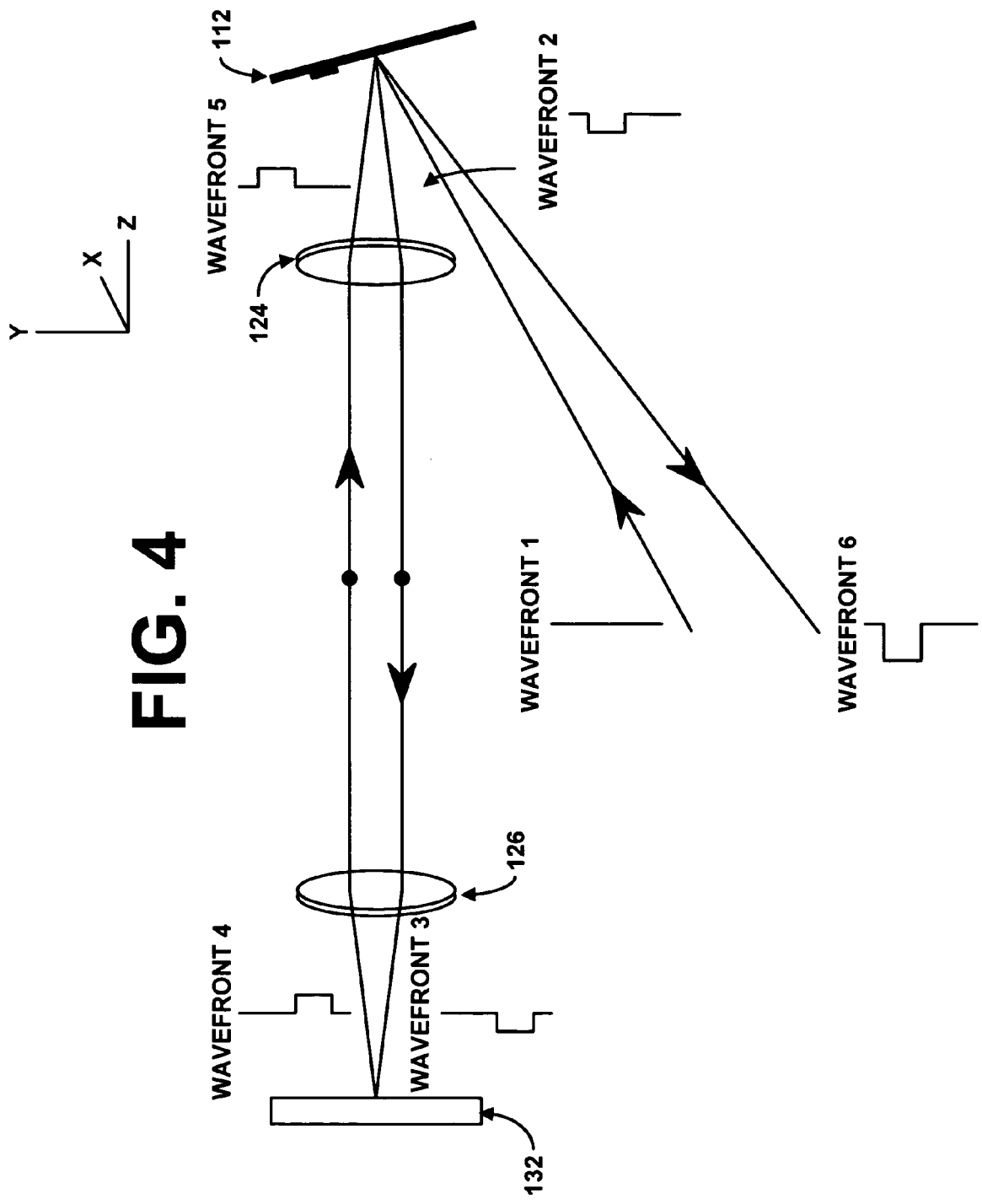
FIG. 4 is a schematic diagram demonstrating wavefront shape throughout traversal of the optical stroke amplification system of FIG. 3.

FIG. 4 is a schematic diagram demonstrating wavefront shape throughout traversal of the optical stroke amplification system 120 (FIG. 3). As is shown by FIG. 4, an originating collimated wavefront 1 traveling in a positive Z-axis direction is reflected in a negative Z-axis direction and provided with a step extending forward in the negative Z-axis direction by the deformable mirror 112, thereby resulting in wavefront 2. The first lens 124 and the second lens 126 collaboratively invert wavefront 2, thereby resulting in wavefront 3, which is still traveling in the negative Z-axis direction with the step extending forward in the negative Z-axis direction.

The mirror 132 reflects wavefront 3, resulting in wavefront 4, which travels in the positive Z-axis direction with the step extending forward in the positive Z-axis direction. The second lens 126 and the first lens 124 collaboratively invert wavefront 4, thereby resulting in wavefront 5, which is still traveling in the positive Z-axis direction with the step extending forward in the positive Z-axis direction. The deformable mirror 112 then reflects wavefront 5 in a negative Z-axis direction and provides an additional step extending forward in the negative Z-axis direction, thereby resulting in wavefront 6. It should be noted that wavefront 6 has a step double the size of the step originally provided by the deformable mirror 112 to wavefront 1. Therefore, the effective stroke of the deformable mirror 112 is increased without physically increasing a step of the deformable mirror 112, or increasing the physical stroke of the deformable mirror actuators that are used to correct for aberrant wavefronts.

Returning to FIG. 3, the mirror 132 is located in an optical path of the lenses 124, 126 so that the mirror 132 may reflect a wavefront received from the second lens 126 back to the second lens 126. In addition, the mirror 132 is located one focal length from the second lens 126 so that if the mirror 132 were replaced by a screen, an inverted image of the deformable mirror 112 would be displayed on the screen. Reflection and wavefront traversal is described in detail below with reference to FIG. 5. Preferably, the mirror 132 is situated so that it is perpendicular to a central axis of the first lens 124 and the second lens 126. It should be noted that the mirror 132 may be replaced by a different reflective device; or reflector, that is capable of accurately reflecting a received wavefront to the second lens 126 without deforming the received wavefront. Although the present description provides a lens pair 122, one having ordinary skill in the art will appreciate that other optical elements may be supplemented, such as, but not limited to, mirrors. In addition, more or fewer lenses may be utilized, examples of which are provided below.

Figure 5:
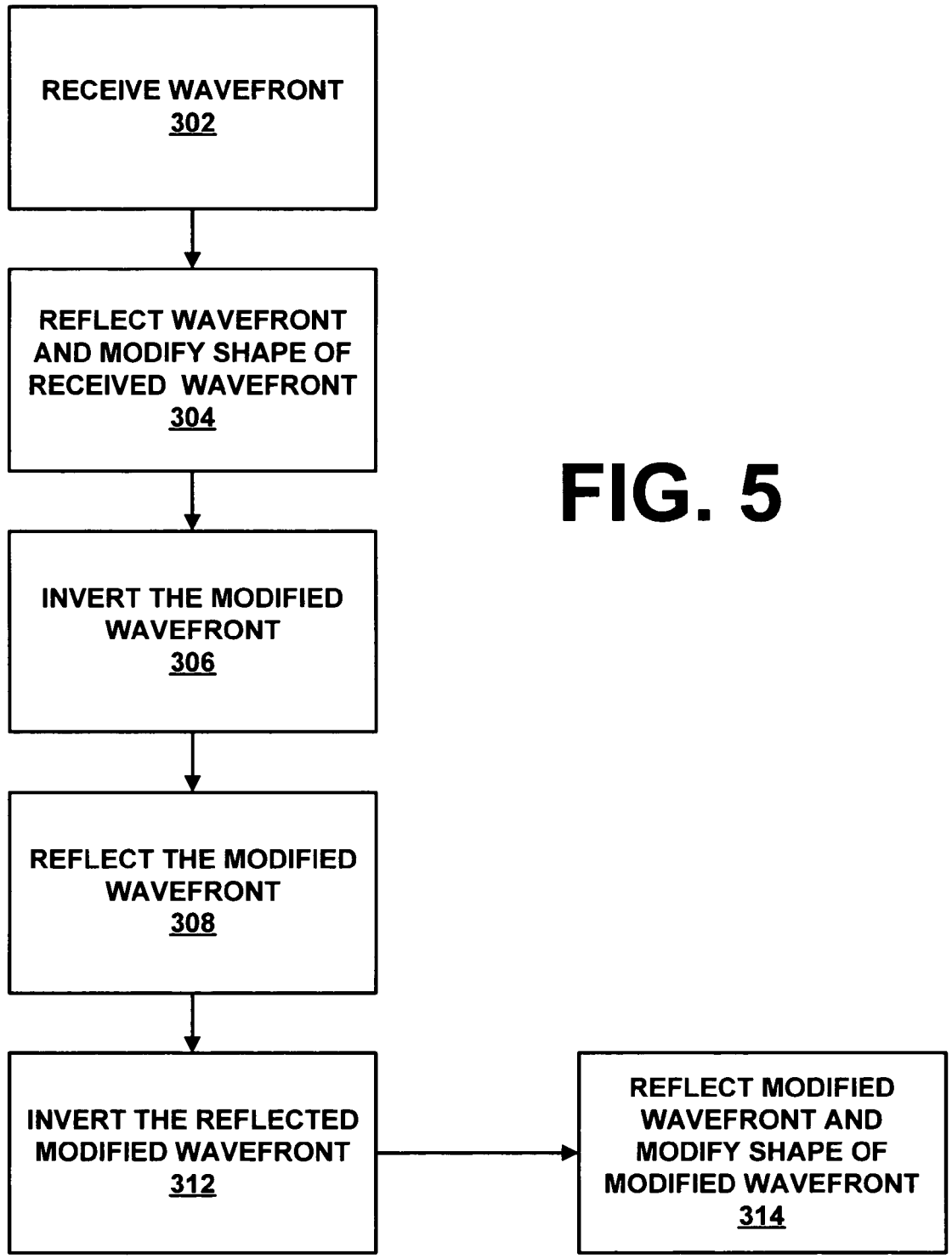
FIG. 5 is a flowchart illustrating a method of correcting aberrant wavefronts as performed via use of the optical stroke amplification system of FIG. 3

FIG. 5 is a flowchart 300 illustrating a method of correcting an aberrant wavefront by modifying shape of the wavefront, as performed via use of the optical stroke amplification system 120 of FIG. 3, in accordance with the first exemplary embodiment of the invention. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 302, a wavefront associated with a beam of light traveling in a positive Z-axis direction is received. Specifically, the wavefront is received by the deformable mirror 112 (FIG. 3). Preferably, the received wavefront has been collimated so as to provide a flat wavefront. It should be noted, however, that the present system and method does not require collimation of the incoming wavefront.

As mentioned above, the wavefront is characterized as having aberrations, which are to be corrected by the optical stroke amplification system 120 (FIG. 3). Since the deformable mirror 112 (FIG. 3) has at least one step (described herein-below as one step for ease of description), the size of which has been defined by control signals received from the real-time controller 150, the wavefront is reflected and shape of the wavefront is modified by the deformable mirror 112 to correct for aberrations, thereby creating a modified wavefront (block 304).

As an example, to maximize correction capability of the deformable mirror 112 (FIG. 3), specific actuators within the deformable mirror 112 (FIG. 3) are instructed by the controller 150 (FIG. 2), via, for example, a transmitted voltage, to move in a direction normal to the plane of the deformable mirror 112 (FIG. 3), thereby defining the step. Movement of the actuators is limited by the physical stroke of each actuator, however, the optical stroke amplification system 120 (FIG. 3) increases the effective stroke of the actuators, as is further explained below.

The modified wavefront reflects off of the deformable mirror 112 (FIG. 3) at an angle and in a negative Z-axis direction. In addition, after reflection by the deformable mirror 112 (FIG. 3), the modified wavefront has a step therein, where the step extends forward in the negative Z-axis direction. It should be noted that upon reflection from a mirror with a step, a wavefront reflecting from the step is shifted in phase by an amount equal to twice the step height in the Z direction (or whichever direction the step extends). That is, for example, a one micrometer step excursion in the mirror produces a two micrometer step excursion in the reflected wavefront phase. The optical stroke amplification system 120 (FIG. 3) may double (or otherwise amplify) the effect of the actuator, so that a one micron stroke, resulting in a two micron wavefront modification, has the effect of a two micron stroke, resulting in a four micron wavefront modification.

Unfortunately, as has been mentioned above, the step provided by the first deformable mirror distortion is typically not more than a few microns. Since the step thus provided is minimal, minimal aberrations are corrected with the first deformable mirror distortion.

As is shown by block 306, the modified wavefront encodes an image of the deformable mirror 112 (FIG. 3) that is a real image at mirror 132. A side effect of that image formation is that the image at mirror 132 is inverted in the X-axis and Y-axis direction. Specifically, the first lens 124 (FIG. 3) and the second lens 126 (FIG. 3) together invert the modified wavefront in the X-axis and Y-axis direction, resulting in the modified wavefront step moving to an opposite side of an optic axis of the lenses 124, 126 (FIG. 3). In other words, the lenses 124, 126 (FIG. 3) flip the lateral orientation of the modified wavefront. It should be noted, however, that after inversion the step of the modified wavefront still extends in the minus Z-axis direction.

The modified wavefront then reflects off of the mirror 132 (FIG. 3) (block 308) in the direction of the deformable mirror 112 (FIG. 3). Upon reflection off of the mirror 132 (FIG. 3) the modified wavefront has the same X-axis and Y-axis orientation, however, the wavefront traverses in the positive Z-axis direction, with the step extending in the positive Z-axis direction.

As is shown by block 312, the reflected modified wavefront is again inverted in the X-axis and Y-axis direction by the lenses 124, 126, and maintained in the positive Z-axis direction. It should be noted that after being inverted the second time by the lenses 124, 126 (FIG. 3) the modified wavefront matches the modified wavefront immediately after distortion of the original wavefront by the deformable mirror 112 (FIG. 3), except that the modified wavefront is reversed in the Z-axis direction. To achieve this orientation (no change in X and Y, but reversal in Z) is the function of the optical elements of the stroke amplifier.

As is shown by block 314, the modified wavefront is reflected and shape of the wavefront is modified a second time by the deformable mirror 112 (FIG. 3) to correct for aberrations. Since the step portion of the modified wavefront protrudes from the rest of the modified wavefront, and the deformable mirror 112 (FIG. 3) still has the step therein, the step portion of the modified wavefront is reflected first, thereby providing a final wavefront having a step that has twice the extent of phase modification that it had after one pass of the deformable mirror 112 (FIG. 3). A physical step of one micrometer on the deformable mirror would therefore impose a four micrometer step on the optical wavefront phase. Specifically, when the modified wavefront is received by the deformable mirror 112 (FIG. 3) a second time, the modified wavefront is aligned such that the step of the modified wavefront is reflected by the step of the deformable mirror 112 (FIG. 3). Therefore, the optical stroke amplification system 120 (FIG. 2) doubles the effect of the deformable mirror 112 (FIG. 3) actuator stroke.

Preferably, the mirror 132 is angled so that the final wavefront, is directed in a desired direction that does not interfere with incoming aberrant wavefronts. As an example, a separation angle of 0.5 degrees may be suitable to separate the incoming aberrant wavefront from the final wavefront. In addition, the pair of lenses 124, 126 (FIG. 3) are used to ensure that the final wavefront has a desired size and a desired orientation. Alternatively, a beam splitter may be used to separate the final wavefront from an incoming aberrant wavefront.

It should be noted that the optical stroke amplification system 120 (FIG. 2) may be modified to provide more than double the effect of the deformable mirror actuator stroke. In fact, by reintroducing the modified wavefront back to the optical stroke amplification system 120 (FIG. 3) the optical stroke amplification system 120 (FIG. 3) may provide an effect that is three or four times or more than that of the deformable mirror actuator stroke. Examples of such modifications are described below as further embodiments of the invention, however, it should be noted that other modifications are possible and that these modifications are not intended to be limited to the embodiments described herein.

Figure 6:
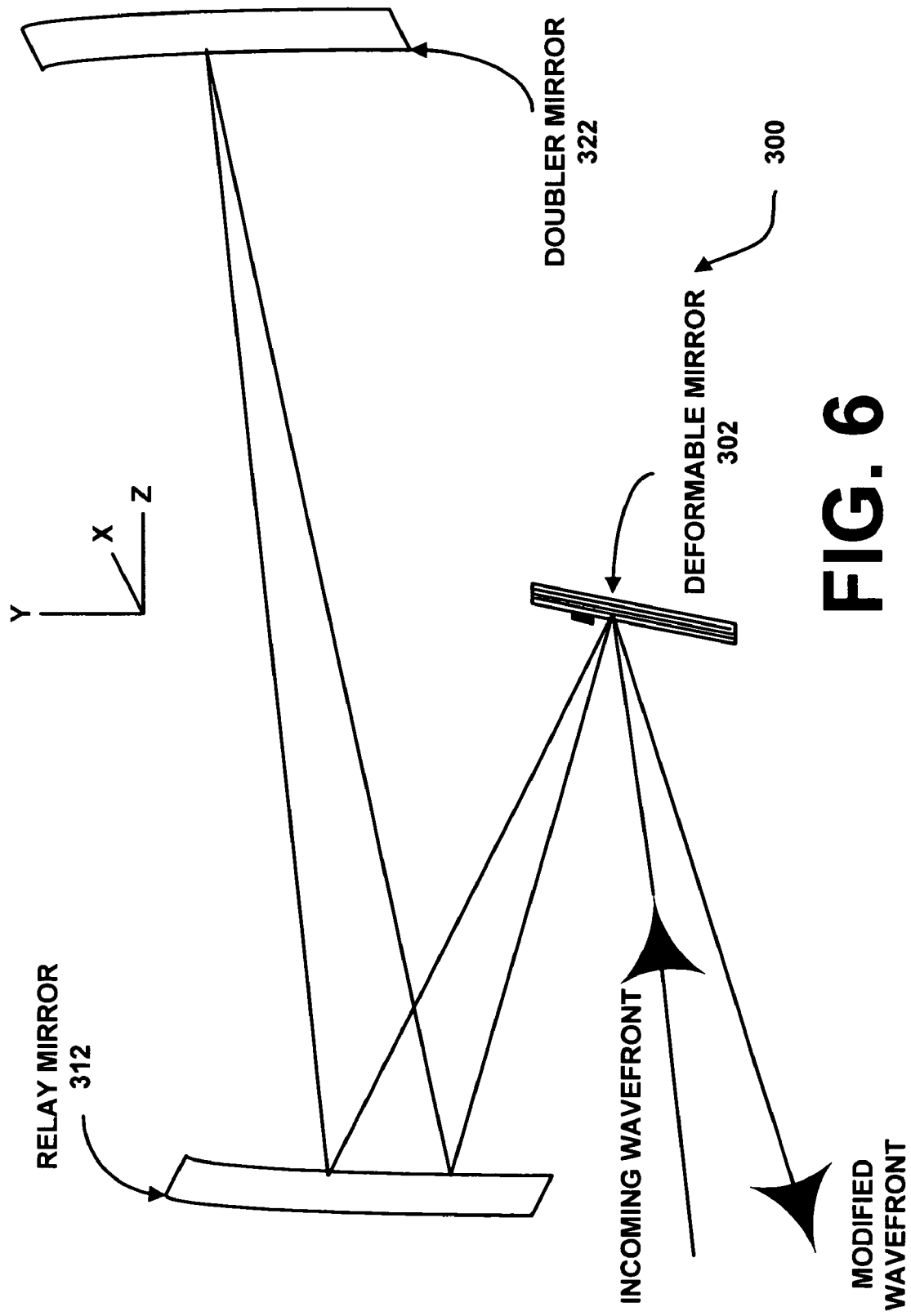
FIG. 6 is a schematic diagram of an optical stroke amplification system, in accordance with a second exemplary embodiment of the invention.

FIG. 6 is a schematic diagram of an optical stroke amplification system 300, in accordance with a second exemplary embodiment of the invention. As is shown by FIG. 6, the optical stroke amplification system 300 contains a deformable mirror 302, a relay mirror 312 and a doubler mirror 322, where the doubler mirror 322 is a concave mirror. Most simply, the deformable mirror 302 is at a focal point of mirror 312, and the focal point of mirror 322 coincides with a focal point of mirror 312, although this is not required. What is required is that mirrors 302 and 322 be optically conjugate. That is, a real image of mirror 302 falls on mirror 322 (and then, of course, a real image of mirror 322 falls on mirror 302). Other arrangements of the optical elements that do not satisfy the requirement of optical conjugation are possible, but more complex.

Preferably, an incoming wavefront has been collimated so as to provide a flat wavefront. As with other embodiments of the invention, however, there is no requirement that the incoming aberrant wavefront be collimated. Since the deformable mirror 302 has at least one step (described herein-below as one step for ease of description), the size of which has been defined by control signals received from the real-time controller 150 (FIG. 2), the wavefront is reflected and the shape of the wavefront is modified by the deformable mirror 302, thereby creating a modified wavefront.

The modified wavefront reflects off of the deformable mirror 302 at an angle and in a negative Z-axis direction. In addition, after reflection by the deformable mirror 302, the modified wavefront has a step therein, where the step extends forward in the negative Z-axis direction.

The modified wavefront is reflected off of the relay mirror 312 to have the same X-axis and Y-axis orientation, however, the wavefront traverses in the positive Z-axis direction, with the step extending in the positive Z-axis direction. The modified wavefront is then reflected off of the doubler mirror 322 to have the same X-axis and Y-axis orientation, however, the wavefront traverses in the negative Z-axis direction, with the step extending in the negative Z-axis direction.

The modified wavefront is then reflected off of the relay mirror 312 a second time to have the same X-axis and Y-axis orientation, however, the wavefront then traverses in the positive Z-axis direction, with the step extending in the positive Z-axis direction.

The modified wavefront is then reflected and the shape of the modified wavefront is modified by the deformable mirror 302. Since the step portion of the modified wavefront protrudes from the rest of the modified wavefront, and the deformable mirror 302 still has the step therein, the step portion of the modified wavefront is reflected first, thereby providing a final wavefront having a step that is twice the height of the step after one pass of the deformable mirror 302. Specifically, when the modified wavefront is received by the deformable mirror 302 a second time, the modified wavefront is aligned such that the step of the modified wavefront is reflected by the step of the deformable mirror 302. Therefore, the optical stroke amplification system 300 of the second exemplary embodiment of the invention doubles the effect of the deformable mirror 302 actuator stroke.

Preferably, the relay mirror 312 and the doubler mirror 322 are angled so that the final wavefront is directed in a desired direction that does not interfere with incoming aberrant wavefronts. Alternatively, a beam splitter may be used to separate the final wavefront from an incoming aberrant wavefront.

Figure 7:
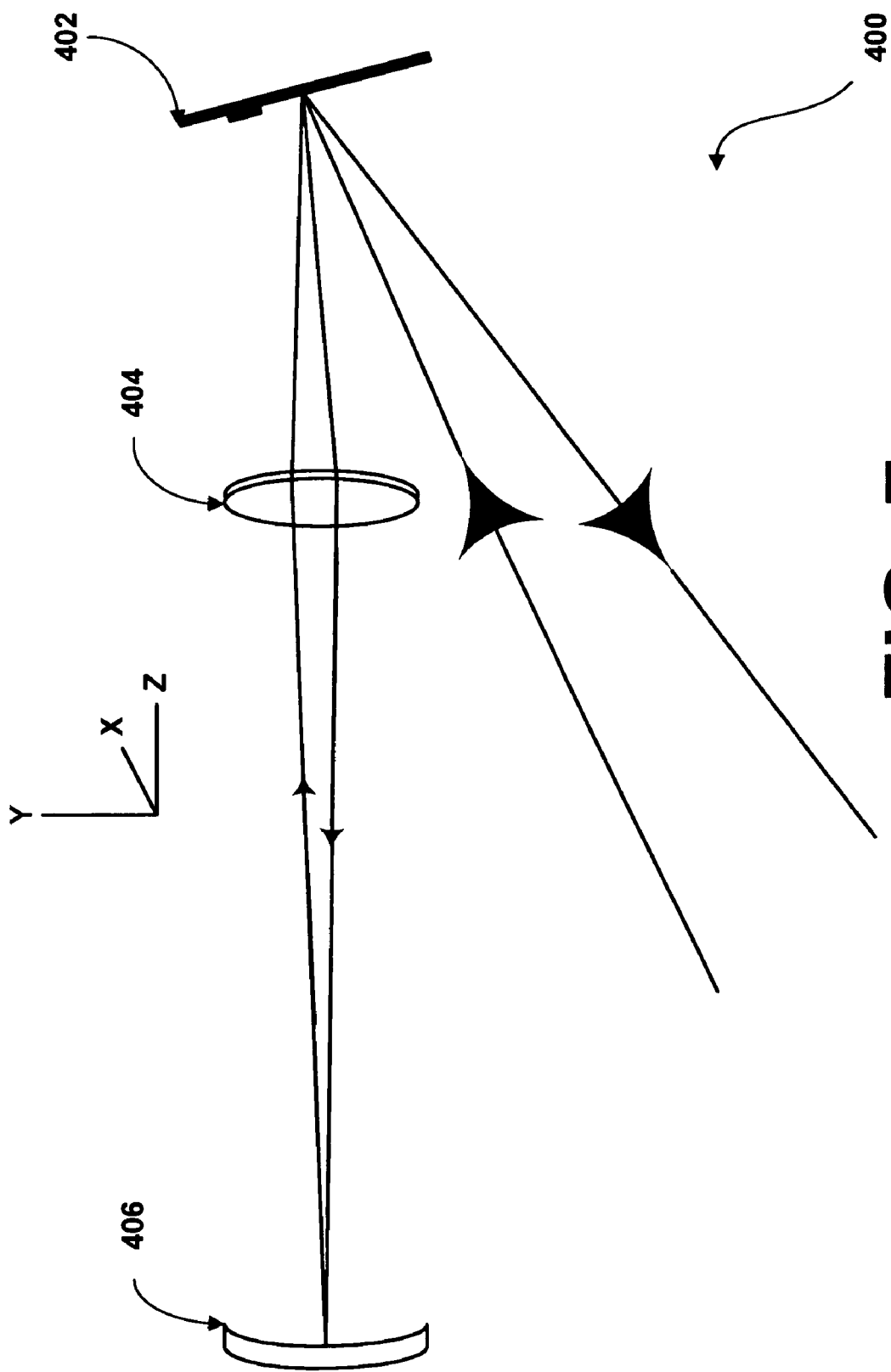
FIG. 7 is a schematic diagram of an optical stroke amplification system, in accordance with a third exemplary embodiment of the invention.

FIG. 7 is a schematic diagram of an optical stroke amplification system 400, in accordance with a third exemplary embodiment of the invention. As is shown by FIG. 3, the optical stroke amplification system 400 contains a deformable mirror 402, a lens 404, and a curved mirror 406. Preferably, the deformable mirror 402 and focal points of the optical stroke amplification system 400 are located at focal lengths of the lens 404, although this is not required.

Preferably, an incoming aberrant wavefront has been collimated so as to provide a flat wavefront. As with other embodiments of the invention, however, there is no requirement that the incoming aberrant wavefront be collimated. Since the deformable mirror 402 has at least one step, the wavefront is reflected and the shape of the wavefront is modified by the deformable mirror 402, thereby creating a modified wavefront.

The modified wavefront reflects off of the deformable mirror 402 at an angle and in a negative Z-axis direction. In addition, after reflection by the deformable mirror 302, the modified wavefront has a step therein, where the step extends forward in the negative Z-axis direction.

The modified wavefront is focused by the lens 404 to the curved mirror 406, which is still in the negative Z-axis direction. The curved mirror 406 reflects the modified wavefront back toward the lens 404. Reflection of the modified wavefront by the curved mirror 406 causes the modified wavefront to travel in the positive Z-axis direction, with the step extending in the positive Z-axis direction. The lens 404 then focuses the modified wavefront back to the deformable mirror 402 where the modified wavefront is reflected a second time and the shape of the modified wavefront is modified a second time resulting is a final modified wavefront.

After the second reflection and modification by the deformable mirror 402 the final modified wavefront travels in the negative Z-axis direction, with the step extending in the negative Z-axis direction. In addition, the step of the final modified wavefront is twice the height of the step after one pass of the deformable mirror 402. Therefore, the optical stroke amplification system 400 of the third exemplary embodiment of the invention doubles the effect of the deformable mirror 402 actuator stroke.

Preferably, the lens 404 focuses the modified wavefront at an angle to the deformable mirror 402 so that the final modified wavefront is directed in a desired direction that does not interfere with incoming aberrant wavefronts. Alternatively, a beam splitter may be used to separate the final modified wavefront from an incoming aberrant wavefront.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for modifying wavefront shape, comprising:
   a wavefront shape modifying device for modifying the shape of a wavefront; and
   a series of optical devices for returning said modified wavefront to said wavefront shape modifying device with an orientation that enables further modification of said modified wavefront by said wavefront shape modifying device.

2. The system of claim 1, wherein said wavefront shape modifying device is a deformable mirror.

3. The system of claim 2, wherein said deformable mirror comprises a series of actuators having a stroke, and wherein said modifying of said shape of said wavefront comprises adding a step to said wavefront, size of said step being defined by said stroke of said actuators.

4. The system of claim 3, further comprising a controller for providing a control signal to said deformable mirror, wherein said control signal determines size of said step.

5. The system of claim 1, further comprising a beam splitter for separating said modified wavefront that has had its shape modified, from a wavefront newly received by said system.

6. The system of claim 4, further comprising a wavefront sensor for assessing wavefront aberrations and instructing said controller to provide said control signal to said deformable mirror.

7. The system of claim 1, further comprising at least one focusing device for defining a path for said modified wavefront to a first reflective device.

8. The system of claim 7, wherein said at least one focusing device also defines a path for said modified wavefront from said first reflective device to said wavefront shape modifying device.

9. The system of claim 1, further comprising a second reflective device for receiving a reflected modified wavefront from a first reflective device, and for reflecting said modified wavefront back to said first reflective device.

10. The system of claim 1, wherein said series of optical devices further comprise:
a first device or first group of devices to form an image of said wavefront shape modifying device on a reflective element; and
a second device or second group of devices to form an image of said reflective element on said wavefront modifying device.

11. The system of claim 10, wherein said second device or second group of devices is said first device or first group of devices, traversed a second time.

12. A method for modifying wavefront shape, comprising the steps of:
reflecting a wavefront from a surface of a wavefront shape modifying device, resulting in said wavefront having a modified shape; and
reflecting said wavefront having a modified shape from said surface of said wavefront shape modifying device a second time resulting in a final wavefront having a shape that has been modified twice.

13. The method of claim 12, further comprising the step of focusing said wavefront having a modified shape so as to direct said wavefront having a modified shape phase back to said surface of said wavefront shape modifying device prior to said step of reflecting said wavefront having a modified shape.

14. The method of claim 12, further comprising the step of reflecting said wavefront having a modified shape back to said surface of said wavefront shape modifying device prior to said step of reflecting said wavefront having a modified shape.

15. The method of claim 12, further comprising the steps of:
focusing said wavefront having a modified shape so as to direct said wavefront having a modified shape to a reflective surface; and
reflecting said wavefront having a modified shape back to said surface of said wavefront shape modifying device prior to said step of reflecting said wavefront having a modified shape.

16. The method of claim 15, wherein said wavefront shape modifying device is a deformable mirror.

17. The method of claim 12, further comprising the step of separating an incoming wavefront from said final wavefront.

18. The method of claim 12, further comprising the step of assessing said wavefront, where results of said assessment determine shape of said surface of said wavefront shape modifying device.

19. The method of claim 18, wherein said step of assessing said wavefront is performed by a human eye.

20. A system for modifying wavefront shape, comprising:
means for reflecting a wavefront from a surface of a wavefront shape modifying device, resulting in said wavefront having a modified shape; and
means for reflecting said wavefront having a modified shape from said surface of said wavefront shape modifying device a second time resulting in a final wavefront.

21. The system of claim 20, further comprising means for focusing said wavefront having a modified shape so as to direct said wavefront having a modified shape back to said surface of said wavefront shape modifying device prior to reflecting said wavefront having a modified shape.

22. The system of claim 20, further comprising means for reflecting said wavefront having a modified shape back to said surface of said wavefront shape modifying device prior to reflecting said wavefront having a modified shape.

23. The system of claim 20, further comprising:
means for focusing said wavefront having a modified shape so as to direct said wavefront having a modified shape to a reflective surface; and
means for reflecting said wavefront having a modified shape back to said surface of said wavefront shape modifying device prior to reflecting said wavefront having a modified shape.

24. The system of claim 23, wherein said wavefront shape modifying device is a deformable mirror.

25. The system of claim 20, further comprising means for separating an incoming wavefront from said final wavefront.

26. The system of claim 20, further comprising means for assessing wavefront aberrations, where results of said assessment determine shape of said surface of said wavefront shape modifying device.

* * * * *